United States Patent
Yamabe

(10) Patent No.: US 7,246,160 B2
(45) Date of Patent: Jul. 17, 2007

(54) COMPUTER MONITORING SYSTEM, COMPUTER MONITORING METHOD AND COMPUTER MONITORING PROGRAM

(75) Inventor: Tomohisa Yamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 770 days.

(21) Appl. No.: 10/352,039

(22) Filed: Jan. 28, 2003

(65) Prior Publication Data
US 2003/0182416 A1 Sep. 25, 2003

(30) Foreign Application Priority Data
Mar. 19, 2002 (JP) .............................. 2002-076316

(51) Int. Cl.
G06F 15/173 (2006.01)
G06F 17/00 (2006.01)
(52) U.S. Cl. ...................... 709/223; 709/200; 709/203; 709/224; 709/225; 709/226; 714/15; 714/19; 714/20; 714/13
(58) Field of Classification Search ................ 709/201, 709/216, 225, 233; 370/323, 256; 707/3, 707/6, 7
See application file for complete search history.

(56) References Cited
U.S. PATENT DOCUMENTS
6,374,311 B1 * 4/2002 Mahany et al. ................ 710/18

6,934,252 B2 * 8/2005 Mehrotra et al. ........... 370/229
6,944,135 B2 * 9/2005 Novaes ........................ 370/256
7,035,933 B2 * 4/2006 O'Neal et al. .............. 709/233

FOREIGN PATENT DOCUMENTS
JP 63-4366 1/1988
JP 4-76651 3/1992
JP 2001-144761 5/2001
JP 2001-175560 6/2001

* cited by examiner

Primary Examiner—David Wiley
Assistant Examiner—Jude Jean-Gilles
(74) Attorney, Agent, or Firm—Young & Thompson

(57) ABSTRACT

A computer monitoring system in which a management console and a plurality of computers are connected to each other via a communication path, the plurality of computers constitute one or more computer groups and the one or more computer groups are logically associated by a tree structure having the management console as the root, wherein each of the plurality of computers has a monitoring element for performing mutual monitoring by mutual communication with other computers in the own computer group on the basis of computer addresses registered in an address list, and a trouble detecting element for detecting any trouble, the result of trouble detection being notified to all the computers belonging to a computer group which constitutes the parent node.

24 Claims, 7 Drawing Sheets

COMPUTER MONITORING SYSTEM, COMPUTER MONITORING METHOD AND COMPUTER MONITORING PROGRAM

BACKGROUND OF THE INVENTION

1. Field of the Invention

The present invention relates to a computer monitoring system, a computer monitoring method and a computer monitoring program, and more particularly to a computer monitoring system, a computer monitoring method and a computer monitoring program permitting mutual monitoring of computers and dynamic reconfiguration of computers even in a large-scale system in which hundreds to thousands of computers are involved.

2. Description of the Related Art

One example of computer monitoring system according to the prior art is described in the Japanese Patent Application Laid-open No. Sho 63-4366. This computer monitoring system according to the prior art is configured of a means which consists of a plurality of computers and a communication path for connecting these computers and transmits, when given the right to transmit health notices, health notices to all the other computers, a means for transmitting a response notice to a health notice from another computer; a means for receiving the response notice; and a means for determining any trouble according to the contents of the response notice.

The prior art computer monitoring system having such a configuration operates in the following manner.

Thus, the right to transmit health notices is transferred among a plurality of computers in a prescribed order of precedence. A computer having the right to transmit transmits health notices to other computers and receives response notices thereto. If the right to transmit is not transferred in the prescribed order of precedence or no response notice is received, the occurrence of trouble can be detected.

This example of the prior art, however, involves the following problems.

A first problem is that it has no possibility for extension when the number of computers is increased.

As a computer having the right to transmit health notices performs communication with other computers on a one-to-one basis, there is a limit to the number of times health notices can be transmitted and response notices received during a certain length of time between the transmitting intervals of health notices. If the number of computers reaches hundreds or even thousands, no mutual monitoring is possible.

A second problem is that dynamic changes in the configuration of mutually monitoring computers cannot be coped with.

In a system consisting of a plurality of computers, the number of computers may be increased or decreased according to the status of the load of processing, some computers may be stopped for regular maintenance, or computers under no load may be automatically suspended from operation to save power consumption. Since mutual monitoring of computers is performed on the basis of predetermined sets of information such as a list of the computers to be mutually monitored and the order of precedence in transferring the right to transmit health notices, no such dynamic change in configuration during operation can be adequately coped with.

SUMMARY AND OBJECTS OF THE INVENTION

An object of the present invention is to provide a computer monitoring system permitting mutual monitoring of computers and dynamic reconfiguration of computers even in a large-scale system in which hundreds to thousands of computers are involved.

A first computer monitoring system according to the invention is a computer network system in which a management console and a plurality of computers are connected to each other via a communication path, the plurality of computers constitute one or more computer groups and the one or more computer groups are logically associated by a tree structure having the management console as the root; each of the plurality of computers is provided with an address list containing the computer addresses of computers constituting the computer group to which the own computer belongs, a parent address list containing the computer addresses of computers constituting the computer group which constitutes the parent node of the own computer, a child address list containing the computer addresses of computers constituting the computer group which constitutes a child node of the own computer, a monitoring means for performing mutual monitoring by mutual communication with other computers in the own computer group via communication path on the basis of computer addresses registered in the address list, a trouble detecting means for detecting any trouble, and a trouble notifying means for notifying, if any trouble is detected by the trouble detecting means, all the computers belonging to the computer group which constitutes the parent node of the result of the trouble detection, wherein the trouble notifying means stores the result of the trouble detection into a memory unit shared within the own group and, if an inquiry is received from any computer belonging to the computer group which constitutes the parent node, notifies the result of the trouble detection stored in the memory unit.

In a second computer monitoring system according to the invention, which is a version of the first computer monitoring system, the monitoring means, if there is any computer group which constitutes a child node, performs mutual monitoring by mutual communication via communication path with computers belonging to the computer group which constitutes the child node on the basis of computer addresses registered in the child address list, the trouble detecting means detects any trouble, and the trouble notifying means notifies the result of the trouble detection, if any trouble is detected by the trouble detecting means, to all the computers belonging to the computer group which constitutes the parent node, stores the result of the trouble detection into the memory unit and, if an inquiry is received from any computer belonging to the computer group which constitutes the parent node, notifies the result of the trouble detection.

A third computer monitoring system according to the invention is a computer network system in which a management console and a plurality of computers are connected to each other via a communication path, a management console and a plurality of computers are connected to each other via a communication path; the plurality of computers constitute one or more computer groups and the one or more computer groups are logically associated by a tree structure having the management console as the root; each of the plurality of computers is provided with an address list containing the computer addresses of computers constituting the computer group to which the own computer belongs, a parent address list containing the computer addresses of computers constituting the computer group which constitutes the parent node of the own computer, a child address list containing the computer addresses of computers constituting the computer group which constitutes a child node of the own computer, and a means for performing mutual monitoring by mutual communication with other computers in the own computer group via communication path on the basis of computer addresses registered in the address list; deleting, if any trouble is detected, the computer address of the computer in which the trouble has arisen from the address list; notifying the updated contents to the other computers in the own computer group to cause the address list each of the computers is provided with to be updated; notifying the exclusion of the computer in which the trouble has arisen from the own computer group to all the computers belonging to the computer group which constitutes the parent node to cause the child address list each of the computers is provided with to be updated; if there is any computer group which constitutes a child node, notifying the exclusion of the computer in which the trouble has arisen from the own computer group to one of the computers belonging to the computer group which constitutes the child node to have the parent address list updated; and causing the updated contents to be notified to all the other computers in the same computer group to cause the parent address list each of the computers is provided with to be updated.

In a fourth computer monitoring system according to the invention, which is a version of the third computer monitoring system, each of the plurality of computers is further provided with a means for judging whether or not the number of computers constituting the computer group to which the own computer belongs is smaller than a predetermined number of computers; if the number is judged to be smaller, instructing, where there is a computer group which constitutes a child node, one of the computers belonging to the computer group which constitutes the child node to shift to the own computer group or instructing, where there is no computer group which constitutes a child node, all the other computers belonging to the own computer group to join the parent node and notifying all the computers belonging to the computer group which constitutes the parent node of the disbanding of the own computer group to cause the computer addresses of all the computers belonging to the own computer group to be deleted from the child address list each of the computers is provided with.

In a fifth computer monitoring system according to the invention, which is a version of the fourth computer monitoring system, the computer instructed to shift is further provided with a means for selecting the computer to be shifted, deleting the computer address of the selected computer from the address list, notifying the updated contents to all the other computers in the same computer group to cause the address list each of the computers is provided with to be updated, and instructing the selected computer to join the computer group which constitutes the parent node.

In a sixth computer monitoring system according to the invention, which is a version of the fourth or fifth computer monitoring system, the computer instructed to join is further provided with a means for notifying one of the computers belonging to the computer group the own computer belongs to of the joining of the own computer, wherein the computer notified of joining judges whether or not the number of computers constituting the own computer group will become greater than the predetermined number if the computer instructed to join does join; if it judges that the number will not become greater, registers the computer address of the computer instructed to join into the address list, and notifies the updated contents to all the other computers in the same computer group to cause the address list each of the computers is provided with to be updated.

In a seventh computer monitoring system according to the invention, which is a version of the sixth computer monitoring system, the computer notified of joining is further provided with a means for judging, if it is judged that the number of computers constituting the computer group will become greater than the predetermined number, whether or not the number of computers in the computer group which constitutes a child node of the own computer group is greater than the predetermined number; if it is judged to be greater, instructing the computer instructed to join to join the computer group which constitutes the child node; if it is judged to be not greater, registering the computer address of the computer instructed to join into the address list, notifying the updated contents to all the other computers in the same computer group to cause the address list each of the computers is provided with to be updated, and partly splitting the own computer group to create a new computer group; notifying the computers not split and remaining in their original computer group of the address list of the computers belonging to the original computer group to cause them to update the address lists they respectively hold; notifying the computers split from the original computer group of the address list of the computers belonging to the new computer group and the parent address list of the computer group which constitutes the parent node to cause the individual computers to update the address lists and the parent address list; and notifying all the computers belonging to the computer group which constitutes the parent node of information regarding the split of the computer group to cause the respective child address lists the individual computers are provided with to be updated.

In an eighth computer monitoring system according to the invention, which is a version of the seventh computer monitoring system, the computer notified of joining is further provided with a means for notifying, if there is any computer group which constitutes a child node, one of the computers belonging to the computer group which constitutes the child node of the information regarding the split of the computer group to have the parent address list updated, and notifying the updated contents to all the other computers in the computer group to cause the parent address list each of the computers is provided with to be updated.

A first computer monitoring method according to the invention comprises, in a computer network system comprising a management console and a plurality of computers connected to each other via a communication path, each of the plurality of computers is provided with an address list containing the computer addresses of computers constituting the computer group to which the own computer belongs, a parent address list containing the computer addresses of computers constituting the computer group which constitutes the parent node of the own computer, and a child address list containing the computer addresses of computers constituting the computer group which constitutes a child node of the own computer, and the plurality of computers further constitute one or more computer groups, the one or more computer groups being logically associated by a tree structure having the management console as the root, a monitoring step of mutual monitoring by the plurality of computers by mutually communicating with other computers in the own computer group via communication path on the basis of computer addresses registered in the address list, a trouble detecting step of detecting any trouble by each of the plurality of computers, and a trouble notifying step of notifying by each of the plurality of computers, if any trouble is detected by the trouble detecting means, the result of the trouble detection to all the computers belonging to the computer group which constitutes the parent node, wherein, at the trouble notifying step the result of the trouble detection is stored into a memory unit shared in the own group and, if an inquiry is received from any computer belonging to the computer group which constitutes the parent node, the result of the trouble detection stored into the memory unit is notified.

In a second computer monitoring method according to the invention, which is a version of the first computer monitoring method, at the monitoring step, if there is any computer group which constitutes a child node, mutual monitoring is performed by mutual communication with computers belonging to the computer group which constitutes the child node via communication path on the basis of computer addresses registered in the child address list, and at the trouble notifying step, if any trouble is detected at the troubled electing step, the result of the trouble detection is notified to all the computers belonging to the computer group which constitutes a parent node, the result of the trouble detection is stored into the memory unit and, if an inquiry is received from the computer group which constitutes the parent node, the result of the trouble detection is notified.

In a third computer monitoring method according to the invention, in a computer network system comprising a management console and a plurality of computers connected to each other via a communication path, each of the plurality of computers being provided with an address list containing the computer addresses of computers constituting the computer group to which the own computer belongs, a parent address list containing the computer addresses of computers constituting the computer group which constitutes the parent node of the own computer, and a child address list containing the computer addresses of computers constituting the computer group which constitutes a child node of the own computer, and the plurality of computers further constituting one or more computer groups, the one or more computer groups being logically associated by a tree structure having the management console as the root, there is included a step of mutual monitoring by each of the plurality of computers by mutual communication with other computers in the own computer group via communication path on the basis of computer addresses registered in the address list; deleting, if any trouble is detected, the computer address of the computer in which the trouble has arisen from the address list; notifying the updated contents to the other computers in the own computer group to cause the address list each of the computers is provided with to be updated; notifying the exclusion of the computer in which the trouble has arisen from the own computer group to all the computers belonging to the computer group which constitutes the parent node to cause the child address list each of the computers is provided with to be updated; if there is any computer group which constitutes a child node, notifying the exclusion of the computer in which the trouble has arisen from the own computer group to one of the computers belonging to the computer group which constitutes the child node to have the parent address list updated; and causing the updated contents to be notified to all the other computers in the same computer group to cause the parent address list each of the computers is provided with to be updated.

In a fourth computer monitoring method according to the invention, which is a version of the third computer monitoring method, there is included a step, by each of the plurality of computers, of judging whether or not the number of computers constituting the computer group to which the own computer belongs is smaller than a predetermined number of computers; if the number is judged to be smaller, instructing, where there is a computer group which constitutes a child node, one of the computers belonging to the computer group which constitutes the child node to shift to the own computer group or instructing, where there is no computer group which constitutes a child node, all the other computers belonging to the own computer group to join the parent node and notifying all the computers belonging to the computer group which constitutes the parent node of the disbanding of the own computer group to cause the computer addresses of all the computers belonging to the own computer group to be deleted from the child address list each of the computers is provided with.

In a fifth computer monitoring method according to the invention, which is a version of the fourth computer monitoring method, there is included a step, by the computer instructed to shift, of selecting the computer to be shifted, deleting the computer address of the selected computer from the address list, notifying the updated contents to all the other computers in the same computer group to cause the address list each of the computers is provided with to be updated, and instructing the selected computer to join the computer group which constitutes the parent node.

In a sixth computer monitoring method according to the invention, which is a version of the fourth or fifth computer monitoring method, there are included a step, by the computer instructed to join, of notifying one of the computers belonging to the computer group the own computer belongs to of the joining of the own computer, and a step, by the computer notified of joining of judging whether or not the number of computers constituting the own computer group will become greater than the predetermined number if the computer instructed to join does join; if it judges that the number will not become greater, registering the computer address of the computer instructed to join into the address list, and notifying the updated contents to all the other computers in the same computer group to cause the address list each of the computers is provided with to be updated.

In a seventh computer monitoring method according to the invention, which is a version of the sixth computer monitoring method, there is included a step, by the computer notified of joining, of judging, if it is judged that the number of computers constituting the computer group will become greater than the predetermined number, whether or not the number of computers in the computer group which constitutes a child node of the own computer group is greater than the predetermined number; if it is judged to be greater, instructing the computer instructed to join to join the computer group which constitutes the child node; if it is judged to be not greater, registering the computer address of the computer instructed to join into the address list, notifying the updated contents to all the other computers in the same computer group to cause the address list each of the computers is provided with to be updated, and partly splitting the own computer group to create a new computer group; notifying the computers not split and remaining in their original computer group of the address list of the computers belonging to the original computer group to cause them to update the address lists they respectively hold; notifying the computers split from the original computer group of the address list of the computers belonging to the new computer group and the parent address list of the computer group which constitutes the parent node to cause the individual computers to update the address lists and the parent address list; and notifying all the computers belonging to the computer group which constitutes the parent node of information regarding the split of the computer group to cause the respective child address lists the individual computers are provided with to be updated.

In an eighth computer monitoring method according to the invention, which is a version of the seventh computer monitoring method, there is included a step, by the computer notified of joining, of notifying, if there is any computer group which constitutes a child node, one of the computers belonging to the computer group which constitutes the child node of the information regarding the split of the computer group to have the parent address list updated, and notifying the updated contents to all the other computers in the computer group to cause the parent address list each of the computers is provided with to be updated.

By a first computer monitoring program according to the invention, in a computer network system comprising a management console and a plurality of computers connected to each other via a communication path, each of the plurality of computers being provided with an address list containing the computer addresses of computers constituting the computer group to which the own computer belongs, a parent address list containing the computer addresses of computers constituting the computer group which constitutes the parent node of the own computer, and a child address list containing the computer addresses of computers constituting the computer group which constitutes a child node of the own computer, and the plurality of computers further constituting one or more computer groups, the one or more computer groups being logically associated by a tree structure having the management console as the root, each of the plurality of computers is caused to execute monitor processing of mutual monitoring by mutually communicating with other computers in the own computer group via communication path on the basis of computer addresses registered in the address list, trouble detection processing of detecting any trouble, and trouble notification processing of notifying, if any trouble is detected by the trouble detecting means, the result of the trouble detection to all the computers belonging to the computer group which constitutes the parent node, wherein, by the trouble notification processing, the result of the trouble detection is stored into a memory unit shared in the own group and, if an inquiry is received from any computer belonging to the computer group which constitutes the parent node, the result of the trouble detection stored into the memory unit is notified.

By a second computer monitoring program according to the invention, which is a version of the first computer monitoring program, by the monitor processing, if there is any computer group which constitutes a child node, mutual monitoring is performed by mutual communication with computers belonging to the computer group which constitutes the child node via communication path on the basis of computer addresses registered in the child address list, and by the trouble notification processing, if any trouble is detected by the trouble detection processing, the result of the trouble detection is notified to all the computers belonging to the computer group which constitutes a parent node, the result of the trouble detection is stored into the memory unit and, if an inquiry is received from the computer group which constitutes the parent node, the result of the trouble detection is notified.

By a third computer monitoring program according to the invention, in a computer network system comprising a management console and a plurality of computers connected to each other via a communication path, each of the plurality of computers being provided with an address list containing the computer addresses of computers constituting the computer group to which the own computer belongs, a parent address list containing the computer addresses of computers constituting the computer group which constitutes the parent node of the own computer, and a child address list containing the computer addresses of computers constituting the computer group which constitutes a child node of the own computer, and the plurality of computers further constituting one or more computer groups, the one or more computer groups being logically associated by a tree structure having the management console as the root, each of the plurality of computers is caused to execute processing to perform mutual monitoring by mutual communication with other computers in the own computer group via communication path on the basis of computer addresses registered in the address list; to delete, if any trouble is detected, the computer address of the computer in which the trouble has arisen from the address list; to notify the updated contents to the other computers in the own computer group to cause the address list each of the computers is provided with to be updated; to notify the exclusion of the computer in which the trouble has arisen from the own computer group to all the computers belonging to the computer group which constitutes the parent node to cause the child address list each of the computers is provided with to be updated; if there is any computer group which constitutes a child node, to notify the exclusion of the computer in which the trouble has arisen from the own computer group to one of the computers belonging to the computer group which constitutes the child node to have the parent address list updated; and to cause the updated contents to be notified to all the other computers in the same computer group to cause the parent address list each of the computers is provided with to be updated.

By a fourth computer monitoring program according to the invention, which is a version of the third computer monitoring program, each of the plurality of computers is caused to execute processing to judge whether or not the number of computers constituting the computer group to which the own computer belongs is smaller than a predetermined number of computers; if the number is judged to be smaller, to instruct, where there is a computer group which constitutes a child node, one of the computers belonging to the computer group which constitutes the child node to shift to the own computer group or to instruct, where there is no computer group which constitutes a child node, all the other computers belonging to the own computer group to join the parent node and to notify all the computers belonging to the computer group which constitutes the parent node of the disbanding of the own computer group to cause the computer addresses of all the computers belonging to the own computer group to be deleted from the child address list each of the computers is provided with.

By a fifth computer monitoring program according to the invention, which is a version of the fourth computer monitoring program, the computer instructed to shift is caused to execute selection of the computer to be shifted, deletion of the computer address of the selected computer from the address list, notification of the updated contents to all the other computers in the same computer group to cause the address list each of the computers is provided with to be updated, and instructing the selected computer to join the computer group which constitutes the parent node.

By a sixth computer monitoring program according to the invention, which is a version of the fourth or fifth computer monitoring program, processing to notify one of the computers belonging to the computer group to which the own computer belongs of the joining of the own computer is caused to be executed by the computer instructed to join, and it is judged whether or not the number of computers constituting the own computer group will become greater than the predetermined number if the computer instructed to join does join; if it is judged that the number will not become greater, the computer address of the computer instructed to join is registered into the address list, and the updated contents are notified to all the other computers in the same computer group to cause the address list each of the computers is provided with to be updated.

By a seventh computer monitoring program according to the invention, which is a version of the sixth computer monitoring program, if it is judged that the number of computers constituting the computer group will become greater than the predetermined number, it is judged whether or not the number of computers in the computer group which constitutes a child node of the own computer group is greater than the predetermined number; if it is judged to be greater, the computer instructed to join is instructed to join the computer group which constitutes the child node; if it is judged to be not greater, the computer address of the computer instructed to join is registered into the address list, the updated contents are notified to all the other computers in the same computer group to cause the address list each of the computers is provided with to be updated, and the own computer group is partly split to create a new computer group; the computers not split and remaining in their original computer group are notified of the address list of the computers belonging to the original computer group to cause them to update the address lists they respectively hold; the computers split from the original computer group are notified of the address list of the computers belonging to the new computer group and the parent address list of the computer group which constitutes the parent node to cause the individual computers to update the address lists and the parent address list; and all the computers belonging to the computer group which constitutes the parent node are notified of information regarding the split of the computer group to cause the respective child address lists the individual computers are provided with to be updated.

By an eighth computer monitoring program according to the invention, which is a version of the seventh computer monitoring program, the computer notified of joining is caused to execute processing to notify, if there is any computer group which constitutes a child node, one of the computers belonging to the computer group which constitutes the child node of the information regarding the split of the computer group to have the parent address list updated, and to notify the updated contents to all the other computers in the computer group to cause the parent address list each of the computers is provided with to be updated.

BRIEF DESCRIPTION OF THE DRAWINGS

The invention will be understood more fully from the detailed description given below and from the accompanying drawings of a preferred embodiment of the invention, which, however, should not be considered as limiting the invention, but is intended only to explain and to facilitate better understanding of the invention.

It should be noted here that like reference numerals represent like elements throughout the disclosure.

DETAILED DESCRIPTION OF THE PREFERRED EMBODIMENT

Now, the present invention will be described in detail with reference to the accompanying drawings.

First, a preferred embodiment of the invention will be described in detail.

Figure 1:
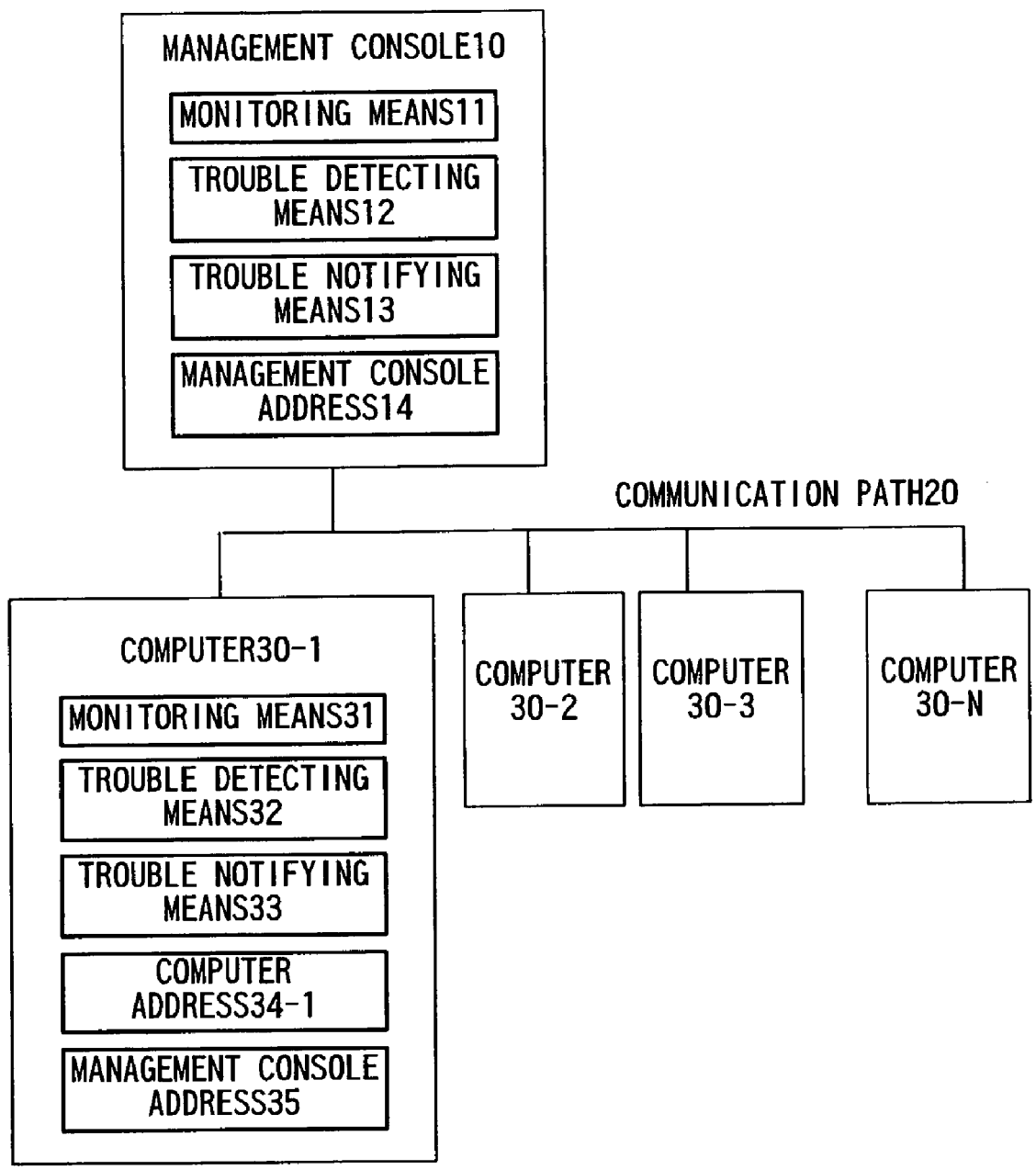
FIG. 1 is a block diagram illustrating the configuration of a preferred embodiment of the invention.

Referring to FIG. 1, the preferred embodiment of the invention is configured of a management console 10, computers 30-120-2, . . . , 30-N, and a communication path 20 for connecting these elements to one another.

The management console 10 is a computer operating under programmed control, which is configured of a monitoring means 11, a trouble detecting means 12 and a trouble notifying means 13, and further holds a management console address 14 as the address for identifying the management console 10 on the communication path 20 (e.g. an IP address).

A computer 30-1 operates under programmed control, which is configured of a monitoring means 31, a trouble detecting means 32 and a trouble notifying means 33, further holds a management console address 34-1 as the address for identifying the computer 30-1 on the communication path 20, and at the same time holds a management console address 35, a similar address to the management console address 14.

The other computers 30-2 through 30-N also hold on the communication path 20 computer addresses 34-2 through 34-N as the addresses for identifying the computers 30-2 through 30-N, respectively, (e.g. IP addresses). Their configurations are the same as that of the computer 30-1 in other respects.

Figure 2:
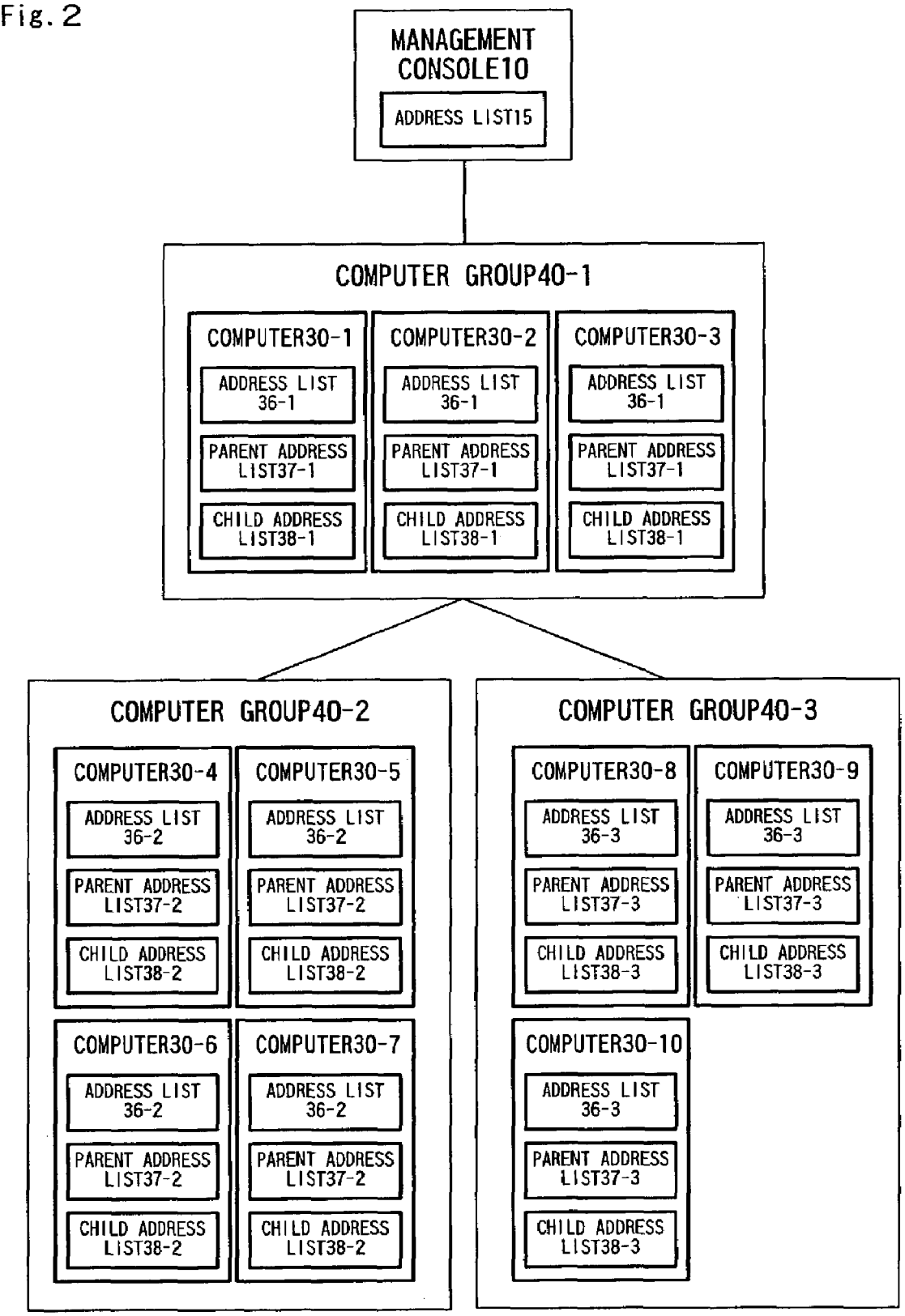
FIG. 2 is another block diagram illustrating the configuration of the embodiment of the invention.

FIG. 2 illustrates the associations between the management console 10 and the computers 30-1 through 30-10. Computers 30-120-2 and 30-3 constitute a computer group 40-1, computers 30-4, 30-5, 30-6 and 30-7 constitute a computer group 40-2, and computers 30-8, 30-9 and 30-10 constitute a computer group 40-3. Further, computer groups 40-130-2 and 40-3 are logically associated in a tree structure having the management console 10 as its root.

To express these associations, the management console 10 holds an address list 15 as addresses to identify the computers belonging to the computer group 40-1, which constitutes a child node of the tree structure. In the address list 15 are stored addresses similar to addresses 34-125-2 and 34-3.

Each of the computers 30-120-2 and 30-3 belonging to the computer group 40-1 holds an address list 36-1 representing addresses to identify the individual computers belonging to the computer group 40-1, a parent address list 37-1 representing the individual computers belonging to the computer group which constitutes the parent node of the tree structure, and a child address list 38-1 representing addresses to identify the individual computers belonging to the computer group which constitutes a child node of the tree structure.

More specifically, in the address list 36-1 are stored addresses similar to the computer addresses 34-125-2 and

34-3. In the parent address list 37-1 is stored an address similar to the management console address 14. In the child address list 38-1 are stored addresses similar to computer addresses 34-4, 34-5, 34-6 and 34-7 and computer addresses 34-8, 34-9 and 34-10.

Similarly, each of the computers 30-4, 30-5, 30-6 and 30-7 belonging to the computer group 40-2 holds an address list 36-2 representing addresses to identify the individual computers belonging to the computer group 40-2, a parent address list 37-2 representing the individual computers belonging to the computer group which constitutes the parent node of the tree structure, and a child address list 38-2 representing addresses to identify the individual computers belonging to the computer group which constitutes a child node of the tree structure.

More specifically, in the address list 36-2 are stored addresses similar to the computer addresses 34-4, 34-5, 34-6 and 34-7. In the parent address list 37-2 are stored addresses similar to the computer addresses 34-1, 34-2 and 34-3. Nothing is stored in the child address list 38-2.

The same is true of an address list 36-3, a parent address list 37-3 and a child address list 38-3 of the computer group 40-3.

The means provided in the management console 10 and the computers 30-1 through 30-10 generally operate in the respective ways described below.

The monitoring means 11 monitors the state of the computers matching the addresses registered in the address list 15, i.e. the computers belonging to the computer group which constitutes a child node.

The trouble detecting means 12 detects any trouble according to the result of monitoring by the monitoring means 11 or a trouble notice from any computer belonging to the computer group which constitutes a child node.

The trouble notifying means 13 notifies the operator or the like of the management console 10 of any trouble detected by the trouble detecting means 12.

The monitoring means 31 monitors the state of the computers matching the addresses registered in an address list 36-N its computer is provided with, i.e. the computers belonging to a computer group 40-N to which its computer belongs, and the state of the computers matching the addresses registered in a child address list 38-N its computer is provided with, i.e. the computers belonging to the computer group which constitutes a child node of the computer group 40-N its computer is provided with, by mutual communication among computers over the communication path. The trouble detecting means 32 detects any trouble according to the result of monitoring by the monitoring means 31 or a trouble notice from any computer belonging to the computer group which constitutes a child node.

The trouble notifying means 33 notifies the computer group which constitutes the parent node of the trouble detected by the trouble detecting means 32. It also gives a notice in response to an inquiry from any computer belonging to the computer group which constitutes the parent node.

Next will be described in detail the overall operations of this preferred embodiment of the invention with reference to FIG. 1 through FIG. 7.

First will be described in detail the operations to monitor computers with reference to FIG. 1 and FIG. 2.

Each of the computers 30-4, 30-5, 30-6 and 30-7 the computer group 40-2 monitors others with its monitoring means 31. Incidentally, the computer group 40-2 performs no monitoring because of the absence of any computer group which constitutes a child node.

The mutual monitoring by the monitoring means 31 is accomplished by mutual communication among the computers via communication path 20 on the basis of computer addresses registered in the address list 36-2, and any trouble that may arise is detected by the trouble detecting means 32.

The result of trouble detection is notified by the trouble notifying means 33 to all the computers belonging to the computer group 40-1 which constitutes the parent node, and in the event of failure to notify any computer belonging to the computer group 40-1, the management console 10 is directly notified.

Further, the trouble notifying means 33 stores the result of trouble detection into a memory unit (not shown), and the result of trouble is shared by all the computers 30-4 through 30-7 belonging to the computer group 40-2. If an inquiry is received from any computer belonging to the computer group 40-1 which constitutes the parent node, the computer having received that inquiry will give a notice.

Each of the computers 30-1 through 30-3 belonging to the computer group 40-1 monitors others with its monitoring means 31, and monitors the computers 30-4 through 30-10 belonging to the computer groups 40-2 and 40-3 which constitute child nodes. The mutual monitoring is accomplished by mutual communication among the computers via the communication path 20 on the basis of computer addresses registered in the address list 36-1 which each of the computers 30-1 through 30-3 is provided with, and any trouble that may arise is detected by the trouble detecting means 32. The result of trouble detection is notified by the trouble notifying means 33 to the management console 10 which constitutes the parent node. Further, the trouble notifying means 33 stores the result of trouble detection into a memory unit (not shown), and the result of trouble detection is shared by the computers 30-1 through 30-3 belonging to the computer group 40-1, and if an inquiry is received from computer belonging to the computer group 40-1 which constitutes the parent node, the computer having received that inquiry will give a notice.

On the other hand, the monitoring of the computers 30-4 through 30-10 belonging to the computer groups 40-2 and 40-3 which constitute child nodes is accomplished by mutual communication among all the computers 30-1 through 30-3 belonging to the computer group 40-1 which constitutes the parent node via the communication path 20 on the basis of computer addresses registered in the child address list 38-1, and any trouble that may arise is detected by the trouble detecting means 32. The result of trouble detection is notified by the trouble notifying means 33 to the management console 10 which constitutes the parent node. Further, the trouble notifying means 33 stores the result of trouble detection into a memory unit (not shown), and the result of trouble detection is shared by the computers 30-1 through 30-3 belonging to the computer group 40-1, and if an inquiry is received from the management console 10 which constitutes the parent node, the computer having received that inquiry will give a notice. Also, in the event that the result of trouble detection is received from any computer belonging to the computer group 40-2 or 40-3 which constitutes a child node, it is stored into amemory unit (not shown), and its contents are notified when an inquiry is received from the management console 10 which constitutes the parent node.

Monitoring by the management console 10 is accomplished through an inquiry, made by the monitoring means 11, with a computer matching one of the addresses registered in the address list 15 via the communication path 20. It communicates with one of the computers in the computer group 40-1 which constitutes a child node, and can thereby know the states of not only the computers belonging to the computer group 40-1 but also all the computers belonging to the computer group 40-2 and the computer group 40-3 which constitute child nodes of the computer group 40-1.

Next will be described in detail the operations to dynamically change the configuration with reference to FIG. 3 through FIG. 7.

First, the operation that is performed when a trouble is detected in a computer group will be described with reference to FIG. 3.

Figure 3:
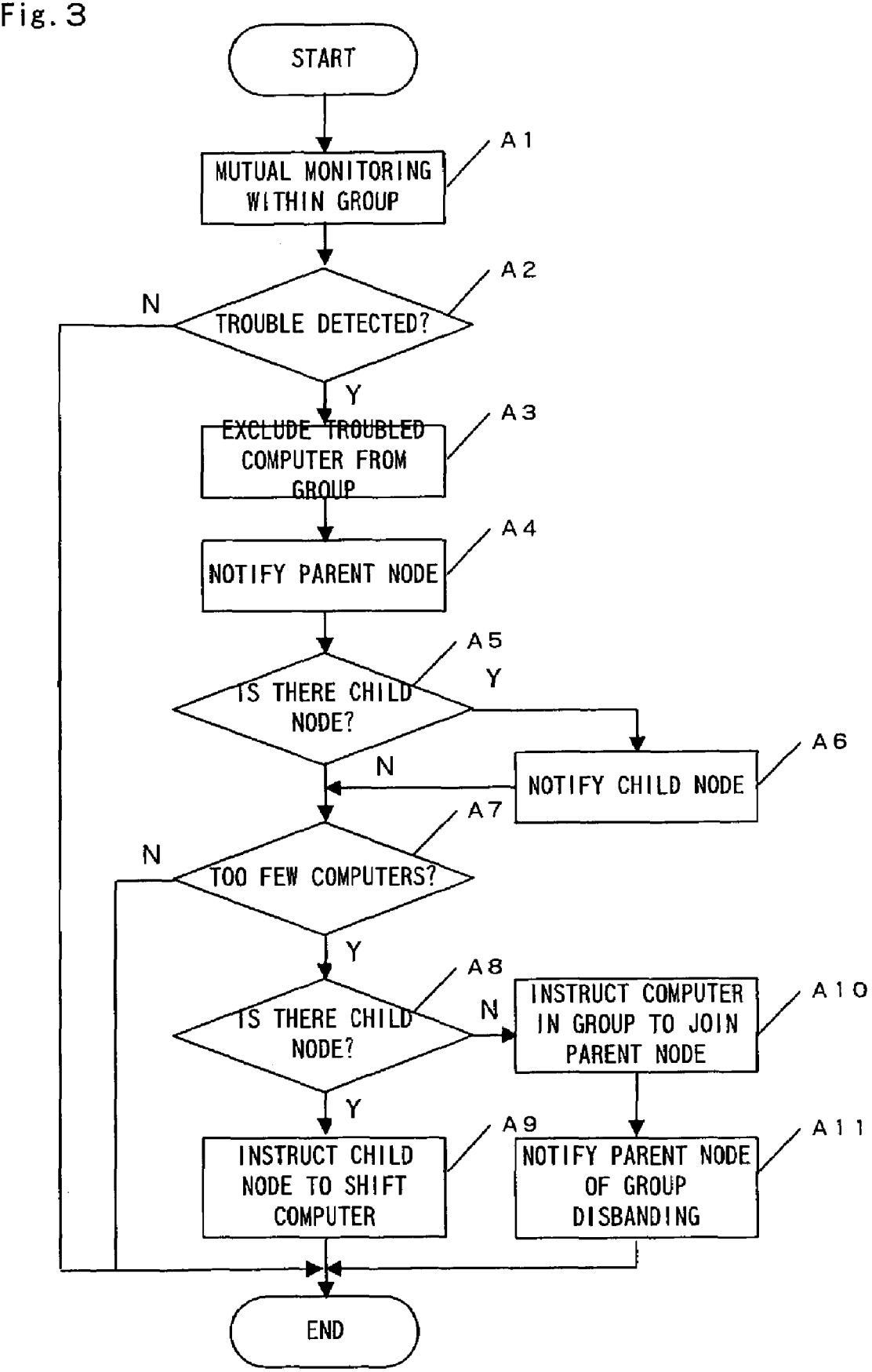
FIG. 3 is a flow chart of operations in the embodiment of the invention.

At the beginning, monitoring within the computer group is performed by mutual monitoring (step A1 in FIG. 3). If any trouble is detected (step A2), the computer having detected the trouble deletes the address of the computer in which the trouble has arisen from the address list 36, and notifies all the computers in the same computer group of its updated contents. The notified computers updates the respective address lists 36 they hold (step A3).

The computer in which a trouble has occurred is excluded from the computer group as described so far.

Then, all the computers belonging to the computer group which constitutes the parent node are notified of the exclusion of the computer in which the trouble has occurred from the computer group, and each notified computer of the computer group which constitutes the parent node updates the child address list 38 it holds (step A4).

If there is any computer group which constitutes a child node, the exclusion of the computer in which the trouble has occurred from the computer group is notified to one of the computers belonging to the computer group which constitutes the child node. The notified computer updates the parent address list 37, and notifies all the other computers in the computer group of the updated contents. The notified computers update the parent address lists 37 they respectively hold (step A6).

It is further judged whether or not the number of computers constituting the group has become smaller than the predetermined number of computers (step A7).

If it is judged that the number is smaller than the predetermined number of computers, one of the computers belonging to the computer group which constitutes a child node, if any, is instructed to shift to the parent node (step A9) (the subsequent operation will be described in detail in the third explanation below).

On the other hand, if there is no child node, all the computers belonging to the own computer group are instructed to join the parent node (step A10) (the operation to join the parent node will be described in detail in the fourth explanation below).

It is also notified to all the computers in the computer group which constitutes the parent node that the own computer group will be disbanded. Each of the notified computers deletes from the child address list 38 it holds the computer address of the computer belonging to the computer group which constitutes a child node and is to be disbanded.

Figure 4:
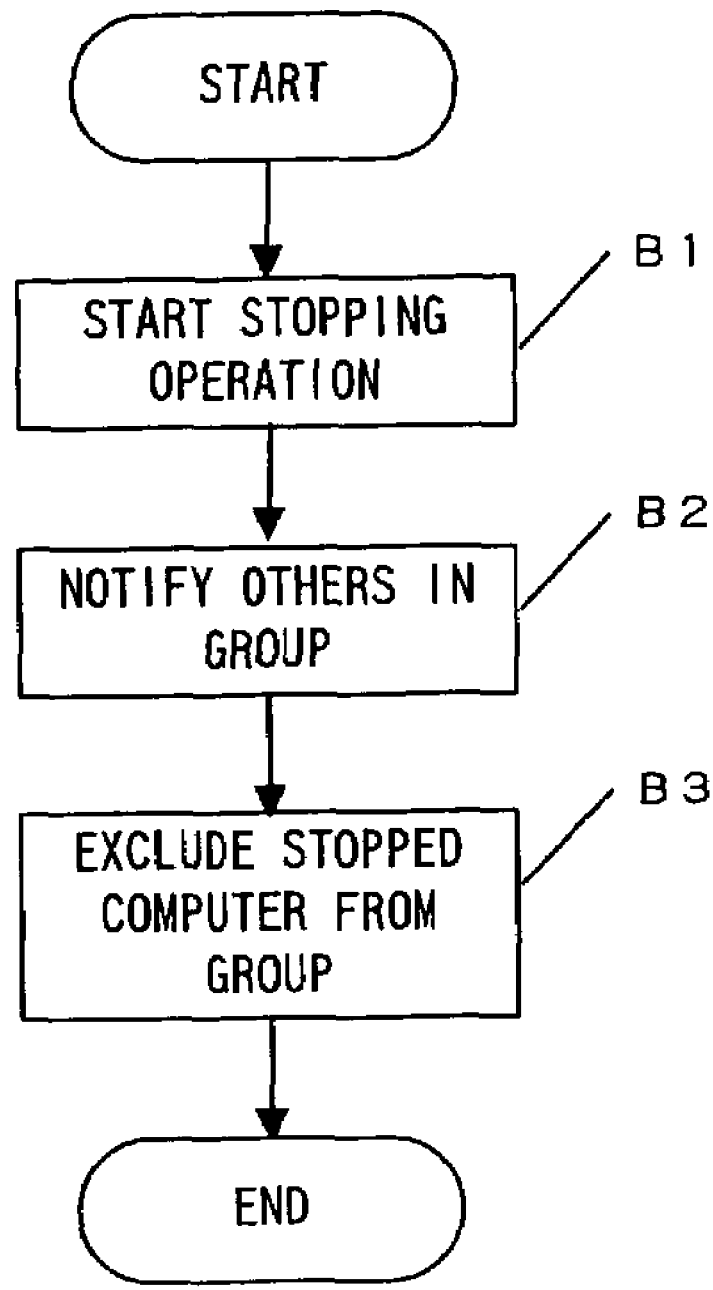
FIG. 4 is a flow chart of other operations in the embodiment of the invention.

Second, the operation that is performed when a computer in a computer group is stopped by normal shutdown or suspend will be described with reference to FIG. 4.

At the beginning, the computer starts the stopping operation (step B1 in FIG. 4), and notifies all the other computers in the computer group to which it belongs that it will stop operating (step B2). Each of the notified computers excludes that stopped computer from the computer group by deleting the computer address of the stopped computer from the address list 36 it holds (step B3). Description of the following steps of operation will be dispensed with because they are the same as those from step A4 onward in FIG. 3.

Figure 5:
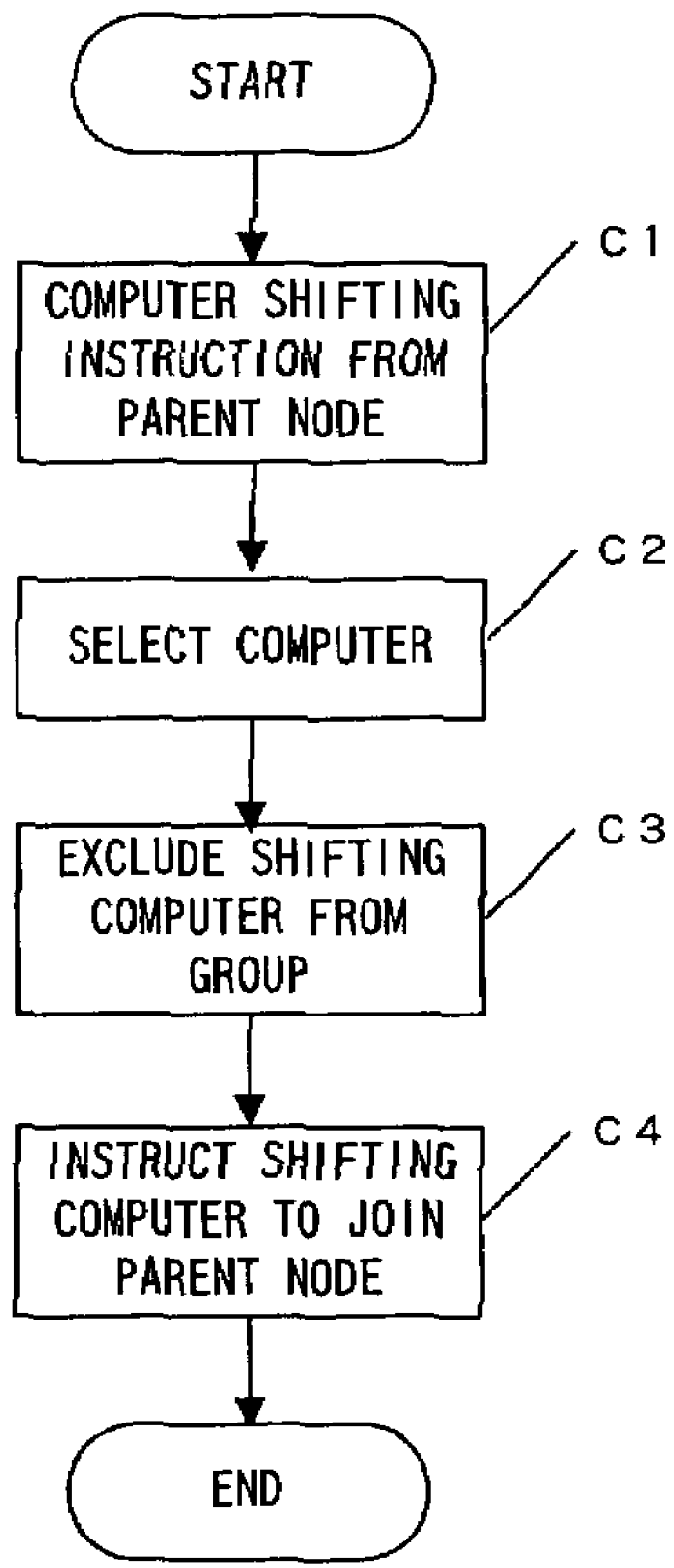
FIG. 5 is a flow chart of other operations in the embodiment of the invention.

Third, the operation that is performed when a computer in a computer group is shifted to another computer group will be described with reference to FIG. 5.

At the beginning, a computer belonging to a computer group which constitutes a child node and has been instructed to shift one computer out of computers belonging to the computer group which constitutes a parent node (step C1 in FIG. 5) selects the computer to be shifted (step C2), deletes the computer address of that computer from the address list 36, and notifies all the other computers in the computer group of the updated contents of its address list 36. Each of the notified computers updates the address list 36 it holds.

The selected computer is excluded from the computer group as described above (step C3).

Next, an instruction is given to a selected computer to join a computer group which constitutes a parent node (step C4). The operation of the instructed computer will be described in detail in the fourth explanation below. Description of the following steps of operation by other computers will be dispensed with because they are the same as those from step A4 onward in FIG. 3.

Fourth, the operation that is performed when a computer is to be added to a computer group will be described with reference to FIG. 6.

Figure 6:
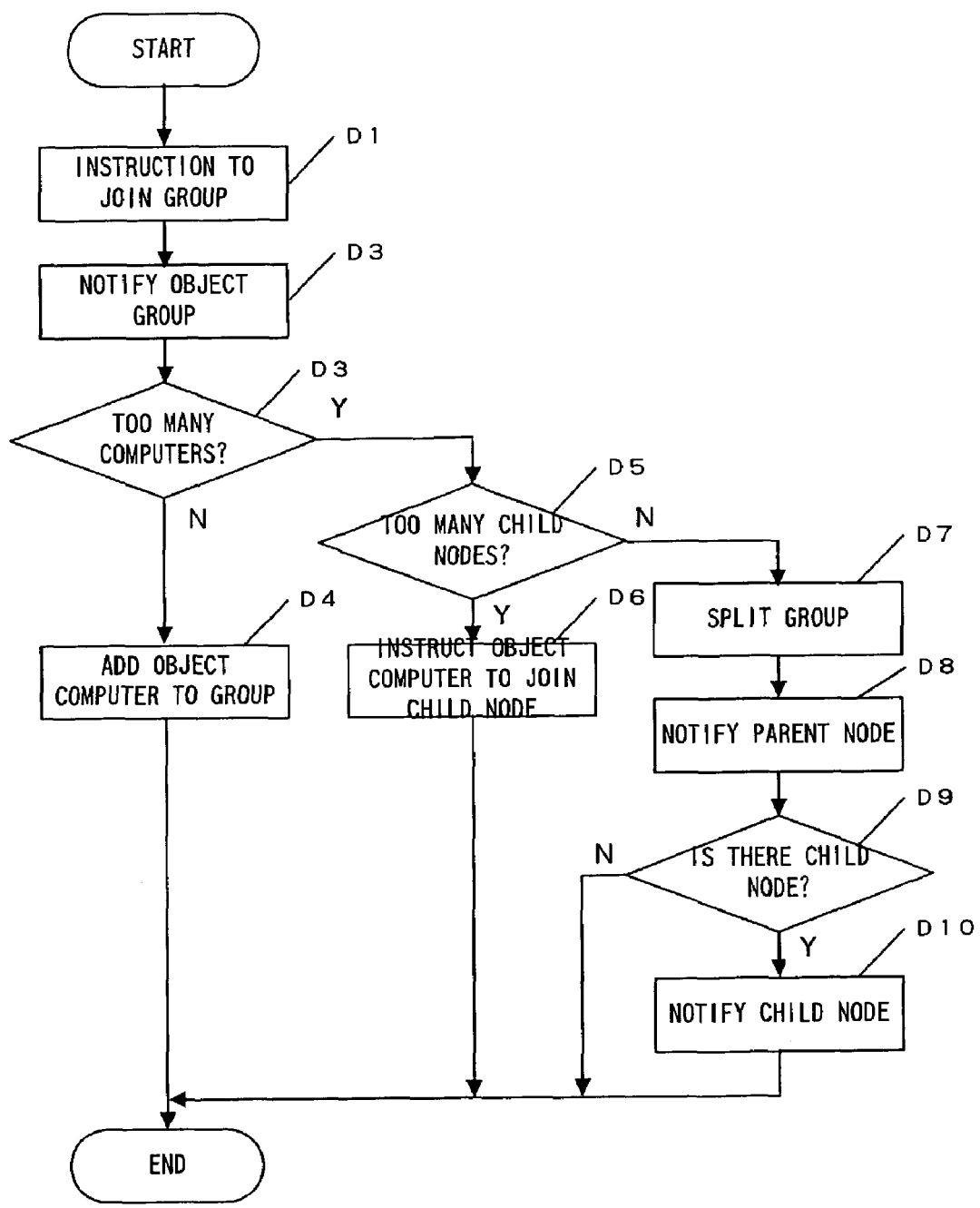
FIG. 6 is a flow chart of other operations in the embodiment of the invention.

First, a joining instruction is given to the computer to be added by delivering to it the address list of the computer group which the computer is to join (step D1 in FIG. 6). This is an instruction to be given at step A10 in FIG. 3 or step C4 in FIG. 5.

The computer to be added notifies one of the computers belonging to the computer group to which it is to join that it will join the group (step D2).

Then, the notified computer judges whether or not the number of computers constituting the group will become greater than the predetermined number if another computer is newly added (step D3). If it is judged that the number of computers constituting the group will not become greater than the predetermined number, the computer notified at step D2 registers the computer address of the computer to be added into the address list 36, and notifies all the other computers in the computer group of the updated contents of its address list 36.

The computers notified of the updated contents of the address list 36 updates the respective address lists 36 they hold. The computer to be added is added to the computer group as described so far (step D4).

If it is judged at step D3 that the number of computers constituting the group will become greater than the predetermined number, the computer notified at step D2 judges whether or not the number of computers in a computer group which constitutes a child node of the pertinent computer group is greater than the predetermined number (step D5).

If it is judged that the number of computers in the computer group which constitutes the child node is greater than the predetermined number, the computer notified at step D2 instructs the computer to be added to join the computer group which constitutes the pertinent child node (step D6). In this case the operation to add to the computer group which constitutes the child node begins with step D1.

If it is judged at step D5 that the number of computers in the computer group which constitutes the child node is not greater than the predetermined number, the computer notified at step D2 registers the computer address of the computer to be added into its address list 36, and notifies all the other computers in the same computer group to which it belongs of the updated contents of its address list 36. The computers notified of the updated contents of the address list 36 update the respective address lists 36 they hold.

The computer notified at step D2 partly splits the computer group to which it belongs, and thereby creates a new computer group.

More specifically, the computer notified at step D2 notifies the computers remaining in their original computer group of the address list 36 of the computers constituting that original computer group to cause them to update the respective address lists 36 they hold, and notifies the computers split from the original computer group of the address list 36 of the computers constituting the new computer group and the parent address list 37 of the computer group which constitutes the parent node to cause the individual computers to update the respective address lists 36 and parent address lists 37 they hold (step D7).

The computer notified at step D2 notifies all the computers belonging to the computer group which constitutes the parent node of the updating of the address list 36 and of information regarding the split, including the particulars of the split. The computers belonging to the computer group which constitutes the parent node update their respective child address lists 38 (step D8).

Further, the computer notified at step D2, if there is a computer group which constitutes a child node, notifies one of the computers belonging to the computer group which constitutes the child node of the split of the computer group, of the updating of the address list 36 and of information regarding the split, including the particulars of the split. The pertinent computer so notified updates its parent address list 37, and notifies all the other computers in the computer group of the updated content. Each of the notified computers updates its parent address list 37 (step D10).

Figure 7:
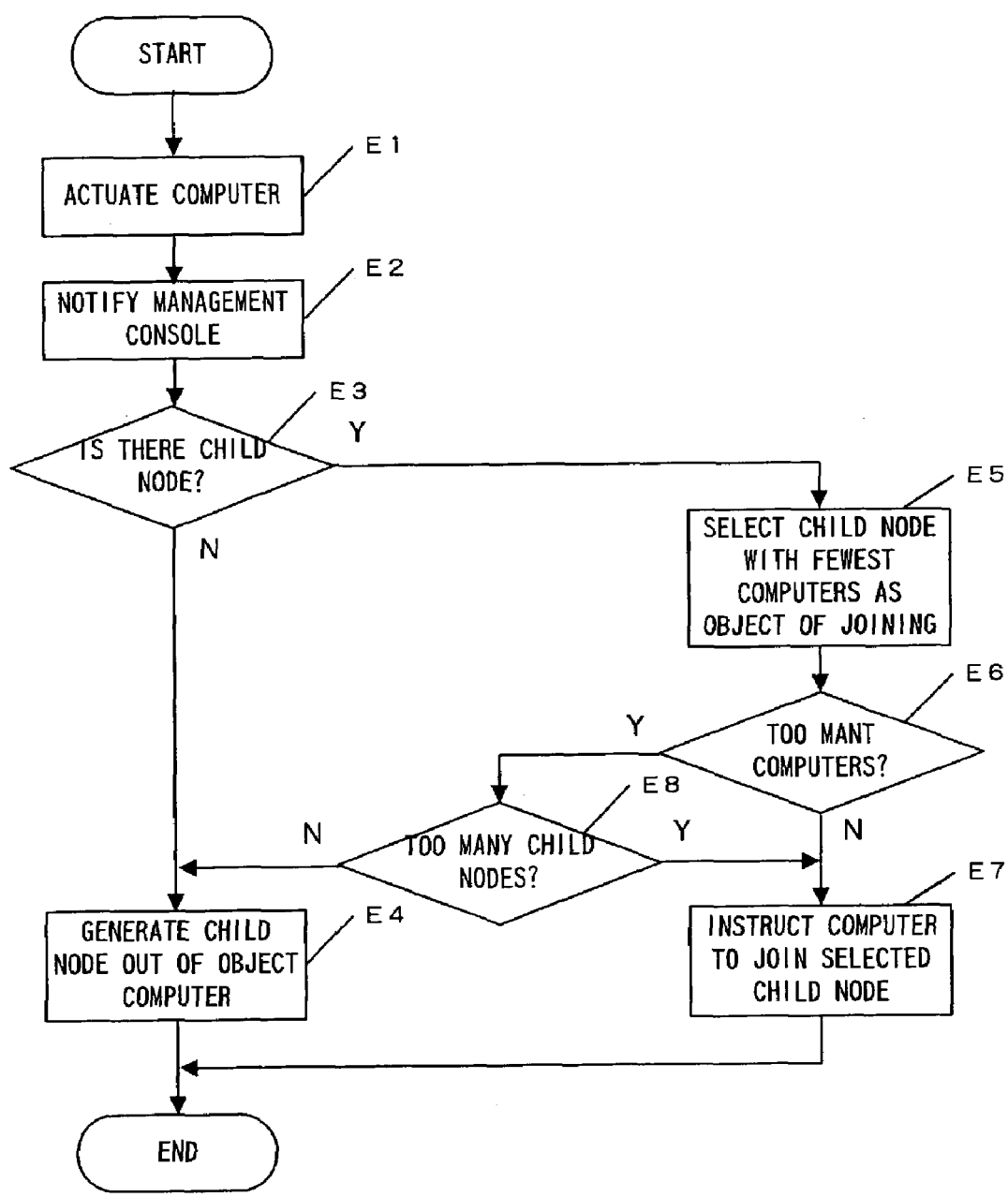
FIG. 7 is a flow chart of other operations in the embodiment of the invention.

Fifth, the operation that is performed when a newly actuated computer is to be added as the object of monitoring will be described with reference to FIG. 7. This includes re-actuation of a computer removed as the object of monitoring on account of trouble or normal shutdown or suspend.

At the beginning, when a computer is newly actuated (step E1 in FIG. 7), the computer notifies the management console 10 of its addition as the object of monitoring (step E2). Then, the management console 10 checks whether or not there is a computer group which constitutes a child node (step E3).

If the result of checking reveals the absence of any computer group which constitutes a child node, i.e. if a computer actuated for the first time becomes an object of monitoring, the management console 10, in order to generate a new computer group, notifies the newly actuated computer of the address list 36 of the computer group and the parent address list 37 including the address of the management console 10 which constitutes the parent node (step E4), and the newly actuated computer prepares the address list 36 and the parent address list 37. In this case, as that computer is the sole computer constituting the group, no mutual monitoring takes place, but monitoring is accomplished by the monitoring of that computer group by the management console 10.

If the result of checking reveals the presence of any computer group which constitutes a child node, the computer group having the smallest number of computers is selected out of the computer groups which constitute child node of the management console 10 (step E5), and it is judged whether or not the number of computers in that computer group is greater than a predetermined number (step E6).

If it is judged that the number is not greater than the predetermined number, the newly actuated computer is instructed to join the computer group selected at step E5 (step E7). In this case, description of the following steps of operation will be dispensed with because they are the same as those from step D1 onward in FIG. 6.

If it is judged that the number is greater than the predetermined number, it is then judged whether or not the number of computer groups which constitute child nodes of the management console 10 is greater than the predetermined number (step E8).

If it is judged that the number is not greater than the predetermined number, a computer group which constitutes a new child node is generated (step E4).

If it is judged that the number is greater than the predetermined number, an instruction to join the computer group selected at step E5 is given because no computer group which constitutes a new child node can be generated (step E7). In this case, description of the following steps of operation will be dispensed with because they are the same as those from step D1 onward in FIG. 6.

As hitherto described, the present invention provides the following advantages.

The first advantage is that the states of many computers can be monitored from a single management console.

The reason is that computer groups are formed to perform mutual monitoring within each group and at the same time each of the computer groups associated with one another in a tree structure monitors a computer group which constitutes its child node.

The second advantage is that, even if any computer is stopped by computer trouble, suspend or the like, the overall configuration can be dynamically altered to continue monitoring.

The reason is that computer groups each constituting a node in the tree structure is configured of a plurality of computers and, even if one of the computers stops, monitoring within the group or of child nodes is continued. Further, even if the number of computers constituting a computer group decreases, the tree structure of computer groups each consisting of a plurality of computers is maintained by shifting a computer from a child node or disbanding the group for combining with the computer group constituting the parent node.

The third advantage is that, where a computer to be monitored is newly added, the overall configuration can be dynamically altered to continue monitoring.

The reason is that a computer is dynamically added to the computer group to continue mutual monitoring. Further, if the number of computers in a computer group becomes too great, the computer group can be split to automatically expand the tree structure.

Although the invention has been described in detail above with reference to a preferred embodiment thereof, it will be appreciated by those skilled in the art that this embodiment has been provided solely for the purposes of illustration, and is in no way to be considered as limiting the invention. Instead, various modifications and substitutions of equivalent techniques will be readily apparent to those skilled in the art upon reading this specification, and such modifications and substitutions as can be regarded as falling within the true scope and spirit of the following claims.

What is claimed is:

1. A computer monitoring system having a configuration comprising:
   a management console;
   a plurality of computers connected to each other via a communication path; and
   first, second and third computer groups, each computer group constituted by a plurality of said computers, wherein said first, second and third computer groups are logically associated by a tree structure having said console as a root, said second computer group constitutes a parent node of said first computer group and said first computer group constitutes a parent node of said third computer group, in which:
   each of said plurality of computers is provided with:
   an address list containing the computer addresses of the computers constituting said first computer group to which said each computer belongs,
   a parent address list containing the computer addresses of the computers constituting said second computer group,
   a child address list containing the computer addresses of the computers constituting said third computer group,
   a monitoring means for performing mutual monitoring by mutual communication with other computers in said first computer group via said communication path on the basis of computer addresses registered in said address list,
   a trouble detecting means for detecting any trouble, and
   a trouble notifying means for notifying the result of said trouble detection, if any trouble is detected by said trouble detecting means, to all the computers belonging to said second computer group wherein:
   said trouble notifying means stores the result of said trouble detection into a memory unit shared within said first computer group and, if an inquiry is received from any computer belonging to said second computer group, notifies the result of said trouble detection stored in said memory unit.

2. The computer monitoring system, as claimed in claim 1, wherein:
   said monitoring means performs mutual monitoring by mutual communication via said communication path with computers belonging to said third computer group on the basis of computer addresses registered in said child address list,
   said trouble detecting means detects any trouble, and said trouble notifying means notifies the result of said trouble detection, if any trouble is detected by said trouble detecting means, to all the computers belonging to said second computer group, stores the result of said trouble detection into said memory unit and, if an inquiry is received from any computer belonging to said second computer group, notifies the result of said trouble detection.

3. A computer monitoring system having a configuration comprising:
   a management console;
   a plurality of computers connected to each other via a communication path; and
   first, second and third computer groups, each computer group constituted by a plurality of said computers, wherein said first, second and third computer groups are logically associated by a tree structure having said console as a root, said second computer group constitutes a parent node of said first computer group and said first computer group constitutes a parent node of said third computer group, in which:
   each of said plurality of computers is provided with:
   an address list containing the computer addresses of the computers constituting said first computer group to which said each computer belongs,
   a parent address list containing the computer addresses of the computers constituting said second computer group,
   a child address list containing the computer addresses of the computers constituting said third computer group, and
   a means for performing mutual monitoring by mutual communication with other computers in said first computer group via said communication path on the basis of computer addresses registered in said address list; deleting, if any trouble is detected, the computer address of the computer in which the trouble has arisen from said address list; notifying the updated contents to the other computers in said first computer group to cause said address list, with which each of the computers is provided, to be updated; notifying the exclusion of said computer in which the trouble has arisen from said first computer group to all the computers belonging to said second computer group to cause said child address list, with which each of the computers is provided, to be updated; notifying the exclusion of said computer in which the trouble has arisen from said first computer group to one of the computers belonging to said third computer group to have said parent address list updated; and causing the updated contents to be notified to all the other computers in said third computer group to cause said parent address list, with which each of the computers is provided, to be updated.

4. The computer monitoring system, as claimed in claim 3, wherein each of said plurality of computers is further provided with:
   a means for judging whether or not the number of computers constituting said first computer group is smaller than a predetermined number of computers; if the number is judged to be smaller, instructing, where there is said third computer group, one of the computers belonging to said third computer group to shift to said first computer group or instructing, where there is no third computer group, all the other computers belonging to said first computer group to join said second computer group and notifying all the computers belonging to said second computer group of the disbanding of said first computer group to cause the computer addresses of all the computers belonging to said first computer group to be deleted from said child address list, with which each of the computers is provided.

5. The computer monitoring system, as claimed in claim 4, wherein said computer instructed to shift is further provided with:
   a means for selecting the computer to be shifted, deleting the computer address of said selected computer from the address list, notifying the updated contents to all the other computers in said third computer group to cause said address list, with which each of the computers is provided, to be updated, and instructing said selected computer to join said first computer group.

6. The computer monitoring system, as claimed in claim 4, wherein said computer instructed to join is further provided with:

a means for notifying one of the computers belonging to said first computer group of the joining of each said computer, wherein:

said computer notified of joining judges whether or not the number of computers constituting the first computer group will become greater than the predetermined number if said computer instructed to join does join; if it judges that the number will not become greater, registers the computer address of said computer instructed to join into said address list, and notifies the updated contents to all the other computers in said first computer group to cause said address list, with which each of the computers is provided, to be updated.

7. The computer monitoring system, as claimed in claim 6, wherein said computer notified of joining is further provided with:

a means for judging, if it is judged that the number of computers constituting said computer group will become greater than the predetermined number, whether or not the number of computers in the computer group which constitutes a child node of said each computer's computer group is greater than the predetermined number; if it is judged to be greater, instructing said computer instructed to join to join the computer group which constitutes said child node; if it is judged to be not greater, registering the computer address of said computer instructed to join into the address list, notifying the updated contents to all the other computers in the same computer group to cause said address list each of the computers is provided with to be updated, and partly splitting the computer group to create a new computer group; notifying the computers not split and remaining in their original computer group of the address list of the computers belonging to the original computer group to cause them to update said address lists they respectively hold; notifying the computers split from the original computer group of the address list of the computers belonging to the new computer group and the parent address list of the computer group which constitutes the parent node to cause the individual computers to update said address lists and said parent address list; and notifying all the computers belonging to the computer group which constitutes the parent node of information regarding the split of the computer group to cause the respective child address lists the individual computers are provided with to be updated.

8. The computer monitoring system, as claimed in claim 7, wherein said computer notified of joining is further provided with:

a means for notifying, if there is any computer group which constitutes a child node, one of the computers belonging to the computer group which constitutes said child node of the information regarding the split of the computer group to have the parent address list updated, and notifying the updated contents to all the other computers in the computer group to cause the parent address list each of the computers is provided with to be updated.

9. A computer monitoring method comprising:

in a computer network system comprising a management console; a plurality of computers connected to each other via a communication path, each of said plurality of computers being provided with an address list containing the computer addresses of the computers constituting said first computer group to which said each computer belongs, a parent address list containing the computer addresses of the computers constituting said second computer group, and a child address list containing the computer addresses of the computers constituting said third computer group; and first, second and third computer groups each of which computer group is constituted by a plurality of said computers, wherein said first, second and third computer groups are logically associated by a tree structure having said console as a root, said second computer group constitutes a parent node of said first computer group and said first computer group constitutes a parent node of said third computer group, a monitoring step of mutual monitoring by said plurality of computers by mutually communicating with other computers in said first computer group via said communication path on the basis of computer addresses registered in said address list, a trouble detecting step of detecting any trouble by each of said plurality of computers, and a trouble notifying step of notifying by each of said plurality of computers, if any trouble is detected by said trouble detecting means, the result of said trouble detection to all the computers belonging to said second computer group, wherein:

at said trouble notifying step the result of said trouble detection is stored into a memory unit shared in said first computer group and, if an inquiry is received from any computer belonging to said second computer group, the result of said trouble detection stored into said memory unit is notified.

10. The computer monitoring method, as claimed in claim 9, wherein:

further at said monitoring step mutual monitoring is performed by mutual communication with computers belonging to said third computer group via said communication path on the basis of computer addresses registered in said child address list, and further at said trouble notifying step, if any trouble is detected at said trouble detecting step, the result of said trouble detection is notified to all the computers belonging to said second computer group, the result of said trouble detection is stored into said memory unit and, if an inquiry is received from said second computer group, the result of said trouble detection is notified.

11. A computer monitoring method comprising:

in a computer network system comprising a management console; a plurality of computers connected to each other via a communication path, each of said plurality of computers being provided with an address list containing the computer addresses of the computers constituting said first computer group to which said each computer belongs, a parent address list containing the computer addresses of the computers constituting said second computer group, and a child address list containing the computer addresses of the computers constituting said third computer group; and first, second and third computer groups each of which computer group is constituted by a plurality of said computers, wherein said first, second and third computer groups are logically associated by a tree structure having said console as a root, said second computer group constitutes a parent node of said first computer group and said first computer group constitutes a parent node of said third computer group, a step of mutual monitoring by each of said plurality of computers by mutual communication with other computers in said first computer group via said communication path on the basis of computer addresses registered in said address list; deleting, if any trouble is detected, the computer address of the computer in which the trouble has arisen from said address list; notifying the updated contents to the other computers in said first computer group to cause said address list, with which each of the computers is provided, to be updated; notifying the exclusion of said computer in which the trouble has arisen from said first computer group to all the computers belonging to said second computer group to cause said child address list, with which each of the computers is provided with to be updated; notifying the exclusion of said computer in which the trouble has arisen from said first computer group to one of the computers belonging to said third computer group to have said parent address list updated; and causing the updated contents to be notified to all the other computers in said third computer group to cause said parent address list, with which each of the computers is provided, to be updated.

12. The computer monitoring method, as claimed in claim 11, further including a step:

by each of said plurality of computers, of judging whether or not the number of computers constituting said first computer group is smaller than a predetermined number of computers; if the number is judged to be smaller, instructing, where there is said third computer group, one of the computers belonging to said third computer group to shift to said first computer group or instructing, where there is no third computer group, all the other computers belonging to said first computer group to join said second computer group and notifying all the computers belonging to said second computer group of the disbanding of said first computer group to cause the computer addresses of all the computers belonging to said first computer group to be deleted from said child address list, with which each of the computers is provided.

13. The computer monitoring method, as claimed in claim 12, further including a step:

by said computer instructed to shift, of selecting the computer to be shifted, deleting the computer address of said selected computer from the address list, notifying the updated contents to all the other computers in said third computer group to cause said address list, with which each of the computers is provided, to be updated, and instructing said selected computer to join said first computer group.

14. The computer monitoring method, as claimed in claim 12, further including:

a step, by said computer instructed to join, of notifying one of the computers belonging to said first computer group of the joining of said each computer, and a step, by said computer notified of joining of judging whether or not the number of computers constituting the first computer group will become greater than the predetermined number if said computer instructed to join does join; if it judges that the number will not become greater, registering the computer address of said computer instructed to join into said address list, and notifying the updated contents to all the other computers in said first computer group to cause said address list, with which each of the computers is provided, to be updated.

15. The computer monitoring method, as claimed in claim 14, further including a step:

by said computer notified of joining, of judging, if it is judged that the number of computers constituting said computer group will become greater than the predetermined number, whether or not the number of computers in the computer group which constitutes a child node of said each computer' computer group is greater than the predetermined number; if it is judged to be greater, instructing said computer instructed to join to join the computer group which constitutes said child node; if it is judged to be not greater, registering the computer address of said computer instructed to join into the address list, notifying the updated contents to all the other computers in the same computer group to cause said address list each of the computers is provided with to be updated, and partly splitting the own computer group to create a new computer group; notifying the computers not split and remaining in their original computer group of the address list of the computers belonging to the original computer group to cause them to update said address lists they respectively hold; notifying the computers split from the original computer group of the address list of the computers belonging to the new computer group and the parent address list of the computer group which constitutes the parent node to cause the individual computers to update said address lists and said parent address list; and notifying all the computers belonging to the computer group which constitutes the parent node of information regarding the split of the computer group to cause the respective child address lists the individual computers are provided with to be updated.

16. The computer monitoring method, as claimed in claim 15, further including a step:

by said computer notified of joining, of notifying, if there is any computer group which constitutes a child node, one of the computers belonging to the computer group which constitutes said child node of the information regarding the split of the computer group to have the parent address list updated, and notifying the updated contents to all the other computers in the computer group to cause the parent address list each of the computers is provided with to be updated.

17. A program embodied in electric signals making possible:

in a computer network system comprising a management console; a plurality of computers connected to each other via a communication path, each of said plurality of computers being provided with an address list containing the computer addresses of the computers constituting said first computer group to which said each computer belongs, a parent address list containing the computer addresses of the computers constituting said second computer group, and a child address list containing the computer addresses of computers constituting said third computer group; and first, second and third computer groups each of which is constituted by a plurality of said computers, wherein said first, second and third computer groups are logically associated by a tree structure having said console as the root, said second computer group constitutes the parent node of said first computer group and said first computer group constitutes the parent node of said third computer group, execution by each of said plurality of computers of:
monitor processing of mutual monitoring by mutually communicating with other computers in said first computer group via said communication path on the basis of computer addresses registered in said address list, trouble detection processing of detecting any trouble, and trouble notification processing of notifying, if any trouble is detected by said trouble detecting means, the result of said trouble detection to all the computers belonging to said second computer group, wherein:
by said trouble notification processing the result of said trouble detection is stored into a memory unit shared in said first computer group and, if an inquiry is received from any computer belonging to said second computer group, the result of said trouble detection stored into said memory unit is notified.

18. The program embodied in electric signals making possible the following procedures of processing, as claimed in claim 17, wherein:
by said monitor processing mutual monitoring is performed by mutual communication with computers belonging to said third computer group via said communication path on the basis of computer addresses registered in said child address list, and
by said trouble notification processing, if any trouble is detected by said trouble detection processing, the result of said trouble detection is notified to all the computers belonging to said second computer group, the result of said trouble detection is stored into said memory unit and, if an inquiry is received from said second computer group, the result of said trouble detection is notified.

19. A program embodied in electric signals making possible:
in a computer network system comprising a management console and a plurality of computers connected to each other via a communication path, each of said plurality of computers being provided with an address list containing the computer addresses of the computers constituting said first computer group to which said each computer belongs, a parent address list containing the computer addresses of the computers constituting said second computer group, and a child address list containing the computer addresses of the computers constituting said third computer group; and first, second and third computer groups each of which groups is constituted by a plurality of said computers, wherein said first, second and third computer groups are logically associated by a tree structure having said console as a root, said second computer group constitutes a parent node of said first computer group and said first computer group constitutes a parent node of said third computer group,
processing to perform mutual monitoring by mutual communication with other computers in said first computer group via said communication path on the basis of computer addresses registered in said address list; to delete, if any trouble is detected, the computer address of the computer in which the trouble has arisen from said address list; to notify the updated contents to the other computers in said first computer group to cause said address list, with which each of the computers is provided, to be updated; to notify the exclusion of said computer in which the trouble has arisen from said first computer group to all the computers belonging to said second computer group to cause said child address list, with which each of the computers is provided with to be updated; to notify the exclusion of said computer in which the trouble has arisen from said first computer group to one of the computers belonging to said third computer group to have said parent address list updated; and to cause the updated contents to be notified to all the other computers in said third computer group to cause said parent address list, with which each of the computers is provided, to be updated.

20. The program embodied in electric signals making possible the following procedure of processing, as claimed in claim 19:
to judge whether or not the number of computers constituting said first computer group is smaller than a predetermined number of computers; if the number is judged to be smaller, to instruct, where there is said third computer group, one of the computers belonging to the computer group to shift to said first computer group or to instruct, where there is no third computer group, all the other computers belonging to said first computer group to join said second computer group and to notify all the computers belonging to said second computer group of the disbanding of said first computer group to cause the computer addresses of all the computers belonging to said first computer group to be deleted from said child address list, with which each of the computers is provided.

21. The program embodied in electric signals making possible the following procedures of processing, as claimed in claim 20:
to select the computer to be shifted, to delete the computer address of said selected computer from the address list, to notify the updated contents to all the other computers in said third computer group to cause said address list, with which each of the computers is provided, to be updated, and to instruct said selected computer to join said first computer group.

22. The program embodied in electric signals making possible the following procedures of processing, as claimed in claim 20, wherein:
said computer instructed to join is caused to execute notification of the joining of said each computer to one of the computers belonging to said first computer group, and
it is judged whether or not the number of computers constituting the first computer group will become greater than the predetermined number if said computer instructed to join does join; if it is judged that the number will not become greater, the computer address of said computer instructed to join is registered into said address list, and the updated contents are notified to all the other computers in said first computer group to cause said address list, with which each of the computers is provided, to be updated.

23. The program embodied in electric signals making possible the following procedure of processing, as claimed in claim 22: to judge, if it is judged that the number of computers constituting said computer group will become greater than the predetermined number, whether or not the number of computers in the computer group which constitutes a child node of said each computer's computer group is greater than the predetermined number; if it is judged to be greater, to instruct said computer instructed to join to join the computer group which constitutes said child node; if it is judged to be not greater, to register the computer address of said computer instructed to join into the address list, to notify the updated contents to all the other computers in the same computer group to cause said address list each of the computers is provided with to be updated, and to partly split the own computer group to create a new computer group; to notify the computers not split and remaining in their original computer group of the address list of the computers belonging to the original computer group to cause them to update said address lists they respectively hold; to notify the computers split from the original computer group of the address list of the computers belonging to the new computer group and the parent address list of the computer group which constitutes the parent node to cause the individual computers to update said address lists and said parent address list; and to notify all the computers belonging to the computer group which constitutes the parent node of information regarding the split of the computer group to cause the respective child address lists the individual computers are provided with to be updated.

24. The program embodied in electric signals making possible the following procedures of processing, as claimed in claim 23, wherein:

if there is any computer group which constitutes a child node, one of the computers belonging to the computer group which constitutes said child node is notified of the information regarding the split of the computer group to have the parent address list updated, and the updated contents are notified to all the other computers in the computer group to cause the parent address list each of the computers is provided with to be updated.

* * * * *